United States Patent [19]
Bahr et al.

[11] Patent Number: 4,528,661
[45] Date of Patent: Jul. 9, 1985

[54] RING COMMUNICATIONS SYSTEM

[75] Inventors: Richard G. Bahr, Framingham; Thomas C. Hogan, Natick, both of Mass.

[73] Assignee: Prime Computer, Inc., Natick, Mass.

[21] Appl. No.: 466,110

[22] Filed: Feb. 14, 1983

[51] Int. Cl.³ .............................................. H04J 3/00
[52] U.S. Cl. ........................................ 370/86; 370/94
[58] Field of Search ...................... 370/86, 85, 60, 94, 370/100

[56] References Cited

U.S. PATENT DOCUMENTS

| | | | |
|---|---|---|---|
| 3,271,688 | 9/1966 | Gschwind et al. | 328/55 |
| 3,537,100 | 10/1970 | Barjot et al. | 325/38 |
| 3,737,778 | 6/1973 | Van Gerwen et al. | 325/322 |
| 3,904,829 | 9/1975 | Martin et al. | 370/86 |
| 3,987,250 | 10/1976 | Barbier et al. | 179/15 BD |
| 3,992,581 | 11/1976 | Davis | 178/70 R |
| 4,002,842 | 1/1977 | Meyr et al. | 370/86 |
| 4,078,228 | 3/1978 | Miyazaki | 370/86 |
| 4,161,786 | 7/1979 | Hopkins et al. | 370/85 |
| 4,282,600 | 8/1981 | Zemanek | 370/100 |
| 4,366,479 | 12/1982 | Mori et al. | 340/825.04 |

OTHER PUBLICATIONS

"Bidirectional Manchester Repeater", Lyndon B. Johnson Space Center, Houston, Texas, NASA Tech Briefs, Fall 1979, p. 324.

Primary Examiner—Douglas W. Olms
Assistant Examiner—Frank M. Scutch, III
Attorney, Agent, or Firm—Lahive & Cockfield

[57] ABSTRACT

A communications network including a plurality of terminals coupled together to provide a unidirectional communications ring. Each of the terminals is adapted to transmit (at an associated fixed data rate) a digital signal to the next downstream terminal on the ring. Each terminal is adapted to receive a digital signal at the data rate associated with the next upstream terminal. In each local terminal, there is a detector for detecting the received synchronization packets and associated data packets are generated for transmission to the next downstream terminal on the ring at a predetermined fixed data rate associated with the local terminal. The data of each transmitted data packet matches bit for bit the data of the corresponding received data packet. The number of bits in the transmit synchronization packet differs from the number of bits in the associated received synchronization packet in a manner so that the data rate for the composite packet formed by the transmitted data packet and associated synchronization data packet corresponds to the transmit data rate for the terminal. The difference varies between predetermined minimum and maximum limits, and may be zero for two terminals having substantially the same transient bit rate.

3 Claims, 2 Drawing Figures

RING COMMUNICATIONS SYSTEM

BACKGROUND OF THE INVENTION

The present invention is in the field of data communications, and more particularly, relates to the synchronization of terminals in ring communications networks.

Ring communications networks generally include a plurality of terminals coupled in series along a unidirectional signal path. In such communications rings, any of the terminals coupled to the ring may transmit or receive data on the ring according to a ring protocol. In the unusual cases where the terminals are all geographically close together, it is a relatively simple matter to synchronize all the terminals, for example, by providing the clock (or timing) signals for use at the respective terminals from a common oscillator. However, in a more typical ring network environment, there is no readily accessible master oscillator. To achieve interterminal synchronization in such systems timing information is added to the transmitted data. In the prior art for such systems, the ring timing information is inserted by a single terminal. All other terminals adapt their transmit rates to the observed incoming data rates. This approach suffers from the disadvantage of having to identify a crucial terminal.

In an alternate prior art approach, all terminals adapt their transmit rates to the observed identified timing source. In effect, the ring topology permits a distributed averaging of the transmit rate. This approach suffers from its sensitivity to the ring delay and from the timing interdependence among the terminals. In particular, an aberrant terminal can produce a difficult to diagnose error situation.

In an alternate prior art approach, a distributed averaging of the transmit rate is achieved where each terminal has an invariant local oscillator whose frequency is some multiple of the transmit bit rate. A terminal's transmit bit rate is then discretely adjusted in accordance with the observed input data rate. The adjustment occurs in time blocks so that the resultant bit rates through the terminal are varied during those blocks while being substantially fixed at other times. As a result, during the blocks, data packets at various terminals might have the same fixed number of bits pass through, but the bits would have adjustable lengths; adjusted so that there is a predetermined nominal clock rate around the ring. In effect, such systems circulate a synchronization word having a fixed number of bits, where the respective bits are discretely variable in length, due to the adjustment. Between synchronization words, the data is clocked at a fixed frequency. While such systems are effective in many applications, there are disadvantages. For example, the sudden introduction of adjustable length bits requires relatively high bandwidth and also prohibits many forms of transceiver design.

It is an object of the present invention to provide an improved bit synchronization system for a ring communications network.

SUMMARY OF THE INVENTION

Briefly, the present invention is directed to a communications network including a plurality of terminals coupled to together to provide a unidirectional communications ring. Each of the terminals is coupled in series along the ring. Each terminal is adapted to transmit (at an associated fixed data rate) a digital signal to the next downstream terminal on the ring. The data rates for the respective terminals in general must be nominally has the form of a succession of data packets interleaved with a succession of synchronization words, or packets. The data packets have a number of bits less than or equal to a predetermined limit, and the synchronization packets have a number of bits between predetermined minimum and maximum limits. In the preferred form of the invention, the synchronization packet includes a succession of bits having a run with the same binary value (e.g. all binary 1's or all binary 0's) bounded on each end by the opposite binary value. Moreover, data packets may not include a run having bits of the same binary value as the run in the synchronization packets and having a length equal to or greater than the minimum length synchronization packet.

Each terminal is adapted to receive a digital signal at the data rate associated with the next upstream terminal. In each local terminal, there is a detector for detecting the received synchronization packets and data packets. From these packets, a succession of synchronization packets and associated data packets are generated for transmission to the next downstream terminal on the ring at a predetermined fixed data rate associated with the local terminal. The data of each transmitted data packet matches bit for bit the data of the corresponding received data packet. The number of bits in the transmit synchronization packet differs from the number of bits in the associated received synchronization packet in a manner so that the data rate for the composite packet formed by the transmitted data packet and associated synchronization data packet corresponds to the transmit data rate for the terminal. The difference varies between predetermined minimum and maximum limits, and may be zero for two terminals having substantially the same transient bit rate.

In one form of the invention, the transmit data rate for any local terminal is related to the transmit data rate of other terminals on the ring. This relationship may be expressed in terms of the length (L) of data packets where $L < W(1-T^2)/2T$ where T is the tolerance of the bit rate associated with the terminal and W is representative of the maximum phase jitter of the signal.

The detector and transmit generator include a transmit clock generator for generating a transmit clock signal having a repetition rate corresponding to the local terminal transmit data rate. An elastic clock generator generates n elastic clock signals, where n is an integer. Each elastic clock signal has a repetition rate corresponding to the transmit data rate for the local terminal, and each is shifted in time with respect to the transmit clock signal by a different multiple of $1/n \times$ the period of the transmit clock signal.

A digital sample and hold network is adapted to sample and hold the received data signal from the upstream terminal at times determined by an applied one of the elastic clock signals. An output shift register clocks the held samples at the transmit clock rate to generate the transmit data packets and the transmit synchronization packets.

A controller is adapted to detect when the sampled and help values correspond to the synchronization packet, and in response to that detection, select one of the elastic clock signals for application to the sample and hold network. Upon such detection, an elastic clock signal is selected which is shifted in time (by periods substantially equal to one-half the period of the transmit clock signal) from the first transition which follows the detected synchronization packet.

Thus, each local terminal transmits data to the next downstream terminal referenced to that local terminal's own invariant oscillator. The data packets of the received digital signal are interleaved with synchronization packets having elastic length that may be increased or decreased to provide appropriate synchronization around the ring. In effect, synchronization is achieved by a shallow discretely adjusted delay (first in - first out) buffer and sample point readjustment network. The first-in and first-out buffer is read at the fixed transmit data rate, and loaded at that same rate until the period of elasticity is detected. At that point, the sample point is reselected so as to fall substantially in the middle of the transmit bit window effectively changing the first-in first-out buffer depth.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
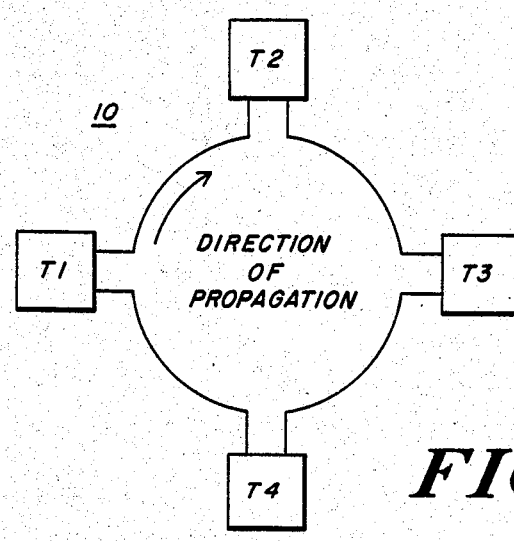
FIG. 1 shows in block diagram form, an exemplary ring communications network embodying the present invention.

FIG. 1 shows a communication network 10 in accordance with the present invention. The exemplary network 10 includes four terminals T1, T2, T3, and T4 coupled in series along a unidirectional signal path to form a communications ring. Each of the terminals includes an input port and an output port. The input port of each terminal is coupled to the output port of the upstream terminal and the output port of each terminal is coupled to the input port of the next downstream terminal.

The present embodiment is particularly adapted to a system in which the digital signals passed from terminal to terminal on network 10 include a succession of data packets interleaved with an associated succession of synchronization packets. The transmit data rate for any local terminal is related to the transmit data rate of the other system terminals. This relationship may be expressed in terms of the maximum bit length for a data packet (L) which is $$L < \frac{W(1 - T^2)}{2T}$$

where T is the frequency tolerance of the local terminal bit rate ($f_{max} - f_{nom}/f_{nom}$) and W is related to the maximum phase jitter per bit ($P_{max}$) for the system, where $W = (T_0 - P_{max})/T_o$, where $T_o$ is the transmit bit period. Thus less than or equal to a predetermined limit. In addition, the synchronization packets have a number of bits between predetermined minimum and maximum limits, for example, 6 and 14 in the present embodiment. Thus the synchronization packet in effect is a ten-bit word, plus or minus four bits. These limits may differ in other embodiments. Generally, the lower limit for a given nominal synchronization packet length is dependent on the probabilities in the system that successive terminals would have associated bit rates requiring the shaving off of bits of that packet down to the lower limit. The upper limit for a given nominal synchronization packet length is dependent on the system throughput requirements for data in the data packets and physical media considerations.

In the present embodiment, 1024 bit data packets are used with synchronization packets nominally having ten bits plus or minus four bits. Furthermore, in the present embodiment, the synchronization packets includes a succession of bits all having the same binary "1". Data packets are restricted to have no run of more than five consecutive 1's.

By way of example, the data may be passed from terminal to terminal by a modulated carrier. At each terminal, the received signal may be converted to a demodulated NRZI digital signal. The NRZI signal may be converted to regenerated NRZ data using a phase locked loop. In that operation, the phase locked loop removes amplitude and phase noise from the recovered data.

The reconstructed, PLL referenced, NRZ data has a bit rate determined by the upstream terminal's bit rate. Correspondingly, this rate may vary relative to this local terminal bit rate in accordance with the crystal tolerances, e.g. .0005 percent, and aging parameters, e.g. 0.0005 percent per year. This difference necessitates a periodic phase adjustment of the PLL-NRZ data to the local terminal bit rate to prevent the local terminal sampling point from drifting too far from the observed center of the bit window. A 1-2 bit variable delay is provided to permit this. When the limits of the delay element are reached, a bit is selectively dropped or added to the passing data stream. In effect, this modulates the transmission rate of the local terminal.

Since the PLL has largely eliminated "edge jitter" in the PLL-NRZ data, the granularity of the delay adjustment is relatively coarse. The minimum adjustment step is the period of the local bit (HS) sample clock. The delay adjustment is done at discrete moments in time. The opportunities for the adjustment are provided by the periodic presence of the synchronization in packets which are interleaved with the passing data packet.

The synchronization packets are identified by a bit pattern whose uniqueness is ensured by the bit stuff protocol. In the present emobodiment, an all "1" pattern is bounded by "0-1" and "1-0" transitions. In the present embodiment, there must be at least 6, and there may be no more than 14 consecutive 1's ween the 0-1 and 1-0 transition edges. The elasticity in the synchronization packet length accommodates the bit insertion or deletion that takes place when the limits of the variable delay element are reached.

| 01111110 | - Minimum length synchronization packet (= 6 "one" bits) |
|---|---|
| 01111111111110 | - Maximum length synchronization |

The variable delay is discretely adjusted. It varies from 1 to 2 bit times in steps that are equal in length to the period of a relatively fast local oscillator, the bit sample (HS) clock.

In the preferred embodiment, this delay is introduced by the two cascaded flipflops of blocks 34 and 18. The second flipflop is loaded from the first at an unvarying rate that is equal to the local terminal bit rate (Tx) clock. The first flipflop samples the PLL-NRZ data approximately in the middle of the bit window. The length of the delay is one Tx clock period plus the time between the first flipflop's sampling and the second flipflop's sample loading.

The first flipflop's sample point is reselected whenever a synchronization character passes. A synchronization packet is determined to be passing whenever 6 or more 1's are loaded in succession into this first flipflop. When this occurs, the first flipflop's sampling is inhibited until a binary 0 (synchronized to the HS clock signal) is detected in the PLL-NRZ data. The appearance of this zero starts a counter which determines the optimal sample point. The reselection of the sample point effectively changes the observed delay.

The reselection may alternatively not affect the passing synchronization packet, truncate it by 1 bit, or extend it by 1 bit. The synchronization packet size will only be altered when a delay limit is reached. If the delay is currently at maximum and needs to grow, it will drop back to the minimum and truncate the packet by one bit (unless the minimum packet length limit is reached). If the delay is at minimum and needs to shrink, it will grow to maximum and extend the packet by one bit (unless the maximum packet length limit is reached). If neighboring terminals encounter the worst case frequency mismatch, 1 in 10 synchronization packets will be changed in length.

The re-clocked transmit data (including both the synchronization and data packets) are then re-encoded into the NRZI format before being modulated onto the carrier and transmitted to the next downstream terminal. The encoding is done relative to the terminal's invariant bit rate clock.

Figure 2:
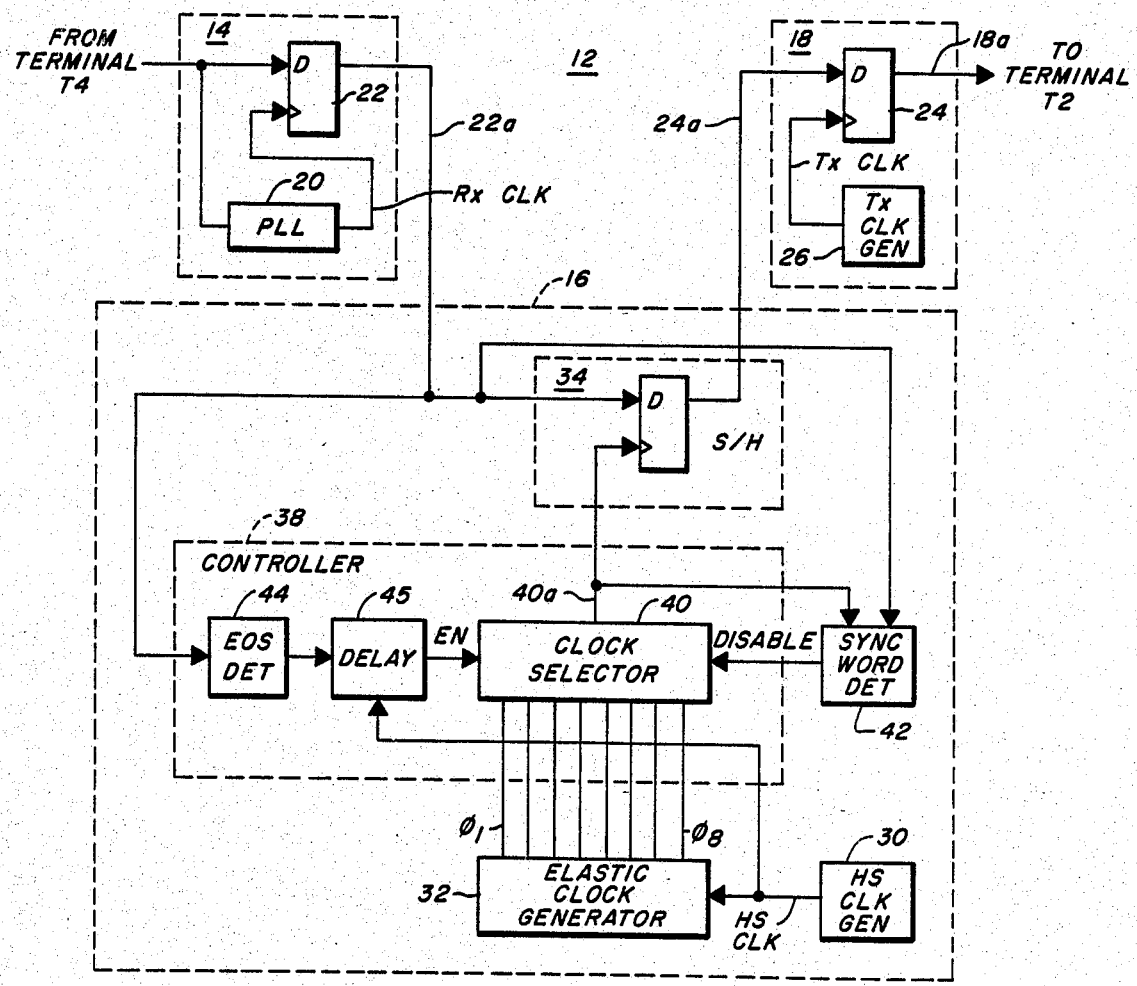
FIG. 2 shows in block diagram form, a synchronization network in the network of FIG. 1.

FIG. 2 shows a synchronizing network 12 in terminal T1 which is similar to corresponding networks in terminals T2–T4. The remaining portions of terminal T1 (for example, devices adapted for interface with other equipment, access control, and the like) are not shown in FIG. 2. The synchronizing network 12 includes input stage 16 coupled to the input port by way of line 14a, an output stage 18 coupled to the output port by way of line 18a, and an intermediate stage 16 coupling stages 14 and 18.

In the present embodiment, the input stage 14 includes a phase locked loop (PLL) clock recovery network 20 and a shift register 22. The PLL network 20 extracts a receive ($R_x$) clock signal from the signal received from terminal T4. The $R_x$ clock signal is applied to shift register 22 to regenerate the data signal applied by way of line 14a in synchronization with the extracted $R_x$ clock signal. This regenerated data signal on line 22a is applied to the intermediate stage 16.

Stage 18 includes an output shift register 24 and a transmit clock generator 26. The transmit clock generator 26 produces a transmit ($T_x$) clock signal at a repetition rate corresponding to the predetermined, fixed transmit data rate associated with the terminal T1. The shift register 24 is clocked by that $T_x$ clock signal and a digital signal applied by way of line 24a to provide a digital signal to the downstream terminal $T_2$ at the transmit data rate associated with terminal $T_1$.

In the present embodiment, the intermediate stage 16 includes a high speed clock generator 30, elastic clock generator 32, a digital sample and hold network 34 and a controller 38. The controller 38 includes a clock selector 40, synchronization word detector 42, end-of-sync (EOS) detector 44, and shift register delay 45.

In the present embodiment, the high speed clock generator 30 generates a high speed (HS) clock signal which is eight times the repetition rate of the transmit signal, and synchronous with that transmit clock signal. The elastic clock generator 32 is coupled to the generator 30 and produces eight elastic clock signals, $O_1$, $O_2$, ... $O_8$, each having a repetition rate corresponding to the transmit data rate. Each of the signals produced by the elastic clock generator 32 is shifted in time with respect to transmit ($T_x$) clock signal by a different multiple of $\frac{1}{8}$ times the period of the transmit clock signal. In other embodiments, different numbers (than eight) of signals may be produced by the clock generator which are also phased appropriately.

The clock selector 40 is adapted to select one of the elastic clock signals and apply that signal by way of line 40a to the clock input of the sample and hold network 34. Network 34 in this embodiment includes a single shift register stage having its data input coupled to line 22a and its data output coupled to line 24a. The application of a clock pulse to the clock input of shift register of network 34 produces a transfer of the binary value at the data input (i.e. line 22a) to the data output (i.e. line 24a) of that shift register.

The synchronization word detector 42 has an input coupled to the line 22a, and a clock input driven by the elastic clock signal on line 40a.

The EOS detector 44 is coupled to line 22a and is adapted to detect transitions in the data on that line. The output of detector 44 is clocked through a shift register delay 45 at the HS clock rate so that the EOP signal occurs four periods of the HS clock signal after the detected transition.

In operation, the clock selector 40 applies one of the elastic clock signals to the sample and hold network 34. The synchronization word detector 42 monitors the digital signal on line 22a. Upon detection of the synchronization packet, i.e. detecting at least six consecutive binary ones, the detector 42 generates a signal to disable the clock selector 40. As a result, an "extended binary one" is in effect produced on line 24a at this time.

Following the sync word detection by detector 42, the end-of-sync (EOS) detector 44 monitors the line 22a to detect the first transition, indicating the end of the synchronization packet. At the latter detection, EOS detector 44 and delay 45 generate an end-of-packet (EOP) signal following n/2 repetition periods of the HS clock signal. This EOP signal is applied to the enable input of clock selector 40, which in turn selects the elastic clock signal ($O_1$, $O_2$ ... $O_8$) which has a transition closest to the EOP signal, and applies that selected elastic clock signal to line 40a until the selector 40 is next disabled.

Until that disablement, the data packet on line 22a is clocked through element 34 in response to the selected elastic clock signal. In this manner, the composite data packets and synchronization packets from element 34 may be clocked through register 24 and to terminal $T_2$ at the $T_x$ clock rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A ring communications network comprising a plurality of terminals coupled together to provide a unidirectional communications ring, each of said terminals including an input port and an output port, Wherein each terminal has its input port coupled to the output port of the next upstream terminal and has its output port coupled to the input port of the next downstream terminal, and wherein each terminal includes:

A. means for receiving a digital signal at said input port at the data rate associated with the next upstream terminal, said received digital signal including a succession of receive data packets interleaved with an associated succession of receive synchronization packets, said data packets having a number of bits less than or equal to a predetermined limit, and said synchronization packets having a number of bits between predetermined maximum and minimum limits, B. means for detecting each receive synchronization packet and its associated receive data packet, C. means responsive to said detecting means for generating a succession of transmit synchronization packets and associated transmit data packets at a predetermined fixed transmit data rate associated with said terminal, wherein the data bits of each transmit data packet match bit for bit the data bits of the corresponding receive data packet and wherein the number of bits in the transmit synchronization packet is the same or different from the number of bits in the associated receive synchronization packet whereby the data rate for each transmit data packet and its associated transmit synchronization packet corresponds to said transmit data rate associated with said terminal, and D. means for transmitting said succession of transmit synchronization packets and associated transmit data packets from said output port at said transmit data rate associated with said terminal.

2. A ring communications network according to claim 1 wherein said detecting means and said generating means includes:

transmit clock generating means for generating a transmit ($T_x$) clock signal, said $T_x$ clock signal having a repetition rate corresponding to said transmit data rate, high speed clock generating means for generating a high speed (HS) clock signal, said HS clock signal having a repetition rate n times said transmit data rate, where n is an integer, and being synchronized with said $T_x$ clock signal, synchronization detector means for detecting said synchronization packet at said input port and for generating a synchronization (S) signal representative of said detection, a first shift register having a data input line coupled to said input port, a data output line coupled to said signal line, and an elastic clock input line, a second shift register having a data input line coupled to said signal line, a data output line coupled to said output port, and a transmit clock input line coupled to said transmit clock generating means, said second shift register being adapted to shift binary levels at its data input line to its data output line in response to said $T_x$ clock signal applied to its transmit clock input line.

a transition detector means coupled to said input port and including means for detecting logic transitions of said digital signal at said input port, and means operative following detection of said synchronization packet for generating an end-of-packet (EOP) signal following n/2 repetition periods of said HS clock signal after the next logic transition of said signal at said input port, and a selectively operable elastic clock generating means coupled said high speed clock generating means and responsive to said HS clock signal, said S signal, and said EOP signal for generating an elastic clock signal synchronous with said EOP signal and at 1/n of the rate of said HS clock signal applied thereto, said elastic clock generating means including means for coupling said elastic clock signal to said elastic clock input line, wherein said elastic clock generating means is disabled following an applied S signal, and is enabled following an applied EOP signal.

3. A ring communications network according to claim 1 wherein the data packet length (L) is $L < W(1-T^2)/2T$, where T is the tolerance of the bit rate associated with said terminal and W is representative of the maximum phase jitter for said data signal.

wherein said detecting means and said generating means includes:

transmit clock generating means for generating a transmit ($T_x$) clock signal, said $T_x$ clock signal having a repetition rate corresponding to said transmit data rate, elastic clock generating means for generating n elastic clock signals, where n is an integer, each elastic clock signal having a repetition rate corresponding to said transmit data rate, and each being shifted in time with respect to said $T_x$ clock signal by a different multiple of 1/n times the period of said $T_x$ clock signal, means for sampling and holding said received data signal at times determined by an applied one of said elastic clock signals, shift register means for clocking said held samples with said $T_x$ clock signal to generate said transmit data packets and said transmit synchronization packets, controller including means for detecting when said sampled and held values correspond to said synchronization packet and in response to said detection selecting one of said elastic clock signals and applying said selected elastic clock signal to said sample and hold means, whereby said selected elastic clock signal is the elastic clock signal which is shifted in time by a period substantially equal to one-half the period of said $T_x$ clock signal from the first transition in said received data signal following detected synchronization packet.

* * * * *

UNITED STATES PATENT AND TRADEMARK OFFICE
CERTIFICATE OF CORRECTION

PATENT NO. : 4,528,661
DATED : July 9, 1985
INVENTOR(S) : Richard G. Bahr and Thomas C. Hogan It is certified that error appears in the above-identified patent and that said Letters Patent is hereby corrected as shown below:

Column 2, line 1: between "nominally" and "has" add --close, but do not have to be identical. The digital signal--.

Column 6, line 3: insert --clock-- after "transmit".

Signed and Sealed this

Fifth Day of August 1986

[SEAL]

Attest:

DONALD J. QUIGG

Attesting Officer

Commissioner of Patents and Trademarks